(12) United States Patent
Jakubiak et al.

(10) Patent No.: US 8,001,532 B1
(45) Date of Patent: Aug. 16, 2011

(54) SYSTEM AND METHOD FOR GENERATING SOURCE CODE-BASED TEST CASES

(75) Inventors: Nathan Michael Jakubiak, Pasadena, CA (US); Marek Kucharski, Cracow (PL)

(73) Assignee: Parasoft Corporation, Monrovia, CA (US)

( * ) Notice: Subject to any disclaimer, the term of this patent is extended or adjusted under 35 U.S.C. 154(b) by 1283 days.

(21) Appl. No.: 11/558,241

(22) Filed: Nov. 9, 2006

Related U.S. Application Data

(60) Provisional application No. 60/781,258, filed on Mar. 10, 2006.

(51) Int. Cl.
*G06F 9/44* (2006.01)
*G06F 11/00* (2006.01)

(52) U.S. Cl. .............................. 717/125; 717/116; 714/46

(58) Field of Classification Search .......................... None
See application file for complete search history.

(56) References Cited

U.S. PATENT DOCUMENTS

| | | | |
|---|---|---|---|
| 6,587,969 B1 * | 7/2003 | Weinberg et al. | 714/46 |
| 6,622,298 B1 * | 9/2003 | Stamm | 717/125 |
| 6,948,152 B2 * | 9/2005 | Dubovsky | 717/124 |
| 7,165,240 B2 * | 1/2007 | Patterson | 717/116 |
| 7,698,686 B2 * | 4/2010 | Carroll et al. | 717/125 |
| 7,873,944 B2 * | 1/2011 | Bangel et al. | 717/124 |
| 7,900,192 B2 * | 3/2011 | Patterson | 717/125 |
| 2004/0133880 A1 * | 7/2004 | Paternostro et al. | 717/124 |
| 2005/0120276 A1 * | 6/2005 | Kolawa et al. | 714/38 |
| 2007/0006036 A1 * | 1/2007 | Devas et al. | 714/38 |
| 2007/0240127 A1 * | 10/2007 | Roques et al. | 717/136 |

OTHER PUBLICATIONS

"Automation of GUI testing using a model-driven approach", Vieira et al., May 2006, pp. 9-14, <http://delivery.acm.org/10.1145/1140000/1138932/p9-vieira.pdf>.*
"Agile regression testing using record & playback", G. Meszaros, Oct. 2003, pp. 353-360, <http://delivery.acm.org/10.1145/950000/949442/p353-meszaros.pd>.*
"Developing cost-effective model-based techniques for GUI testing", Q. Xie, May 2006, pp. 997-1000, <http://delivery.acm.org/10.1145/1140000/1134473/p997-xie.pd>.*

* cited by examiner

*Primary Examiner* — Thuy Dao
(74) *Attorney, Agent, or Firm* — Christie, Parker & Hale, LLP

(57) ABSTRACT

A method and system for generating source code-based test cases for a remote application. The method and system include storing a table including mapping between user-inputs and a corresponding source code fragment; recording user's actions in the remote application by a test tool; accessing the table to locate corresponding source code fragments for the recorded user's actions; retrieving the corresponding source code fragments to generate source code-based test cases; compiling the source code-based test cases; and executing the compiled source code-based test cases outside of the test tool.

13 Claims, 2 Drawing Sheets

FIG. 1

Storing a table including mapping between a user inputs and a corresponding source code fragment — 11

Recording user's actions — 12

Accessing the table to locate corresponding source code fragments for the recorded user actions — 13

Retrieving the corresponding source code fragments to generate source code-based test cases — 14

Compiling the source code-based test cases — 15

Executing the compiled source code-based test cases outside of the test tool — 16

SYSTEM AND METHOD FOR GENERATING SOURCE CODE-BASED TEST CASES

CROSS-REFERENCE TO RELATED APPLICATION

This patent application claims the benefit of the filing date of U.S. Provisional Patent Application Ser. No. 60/781,258, filed on Mar. 10, 2006 and entitled "SYSTEM AND METHOD FOR AUGMENTING SOURCE CODE WITH TEST CASES," the entire content of which is hereby expressly incorporated by reference.

FIELD OF THE INVENTION

The present invention relates generally to testing computer software; and more particularly to a system and method for generating source code-based test cases.

BACKGROUND OF THE INVENTION

Testing frameworks for client/server applications, for example, remote applications such as web applications, typically have a graphical user interface (GUI) in which a user can define test cases. Alternatively, some testing frameworks may provide some Application Programming Interface (API) which can be used to define the test cases. An example of a framework with a GUI is a testing tool like WebKing™ from Parasoft® Corp., in which the user can set up test cases within the graphical interface presented by the program.

An example of a framework that provides an API would be the Java library HttpUnit in which the user can define test cases by writing code that refers to the HttpUnit API. In some cases, a testing tool may have both a GUI and an API with which to set up test cases. The tools that use both methodologies usually use a programming language or API that can only be run within the context of the tool.

Typically, two primary aspects of a test case are defined for a remote application. One is the part that defines what requests to make to the web server. The other is the part that determines the validation done on responses sent back by the server.

The main advantage of using a testing tool with a GUI is that the tool typically gives the user easy ways to define the requests to make to the web server. For example, the test tool may allow the user to record the actions taken in a web browser and store them so that they can be "replayed" at a later date. This is usually quite easy when done in this way. However, the user may want more advanced control over the test case than the GUI may provide, like the ability to loop over a portion of the test case or the ability to conditionally run a certain part of the test. These are tasks that are quite easily done using test cases defined in source code but are difficult to provide within a GUI.

Testing tools usually also provide functionality for validating the responses returned by the server being tested. For example, the tool may automatically set up validation tests that attempt to determine that the web server is responding properly. However, due to the dynamic nature of most server applications, it can be quite difficult for the tool to create tests that do not report false positives.

Alternatively, the tool may allow the user to manually set up validation tests on specific portions of the response. This eliminates false positives, and may be quite easy to use if it resides within a graphical interface, but it likely does not provide the level of control a user might need in order to set up the required test. Both of these examples are cases where using a GUI is easier but using test cases defined in source code provides more flexibility and less noisy tests.

While source code is more customizable, the main disadvantages are that it often requires a user to learn a non-standard programming language; it requires understanding of programming; and it is more tedious to write.

Therefore, there is a need for a software testing tool that more easily and efficiently generates test cases defined in computer source code to test client/server applications.

SUMMARY

In one embodiment, the method and system of the present invention are capable of setting up the tests within a GUI, generating source code using a common API that mimics those tests, and running the compiled source code outside the application that generated it. The test tool generates most of the code, and then the user modifies only that portion(s) of the code that needs to be customized. This combines the ease-of-use benefits of a GUI while giving the user the customizability of working with source code. In addition, since the code uses a common API, the user does not need to learn a new language. It is also easier to run the test cases since they can be run in an environment that is not aware of the testing tool.

In one embodiment, the present invention is a method and system for generating source code-based test cases for a remote application. The method and system include storing a table including mapping between user-inputs and a corresponding source code fragment; recording user's actions in the remote application by a test tool; accessing the table to locate corresponding source code fragments for the recorded user's actions; retrieving the corresponding source code fragments to generate source code-based test cases; compiling the source code-based test cases; and executing the compiled source code-based test cases outside of the test tool.

BRIEF DESCRIPTION OF THE DRAWINGS

FIG. 1 is an exemplary process flow according to one embodiment of the present invention.

DETAILED DESCRIPTION

Figure 2:
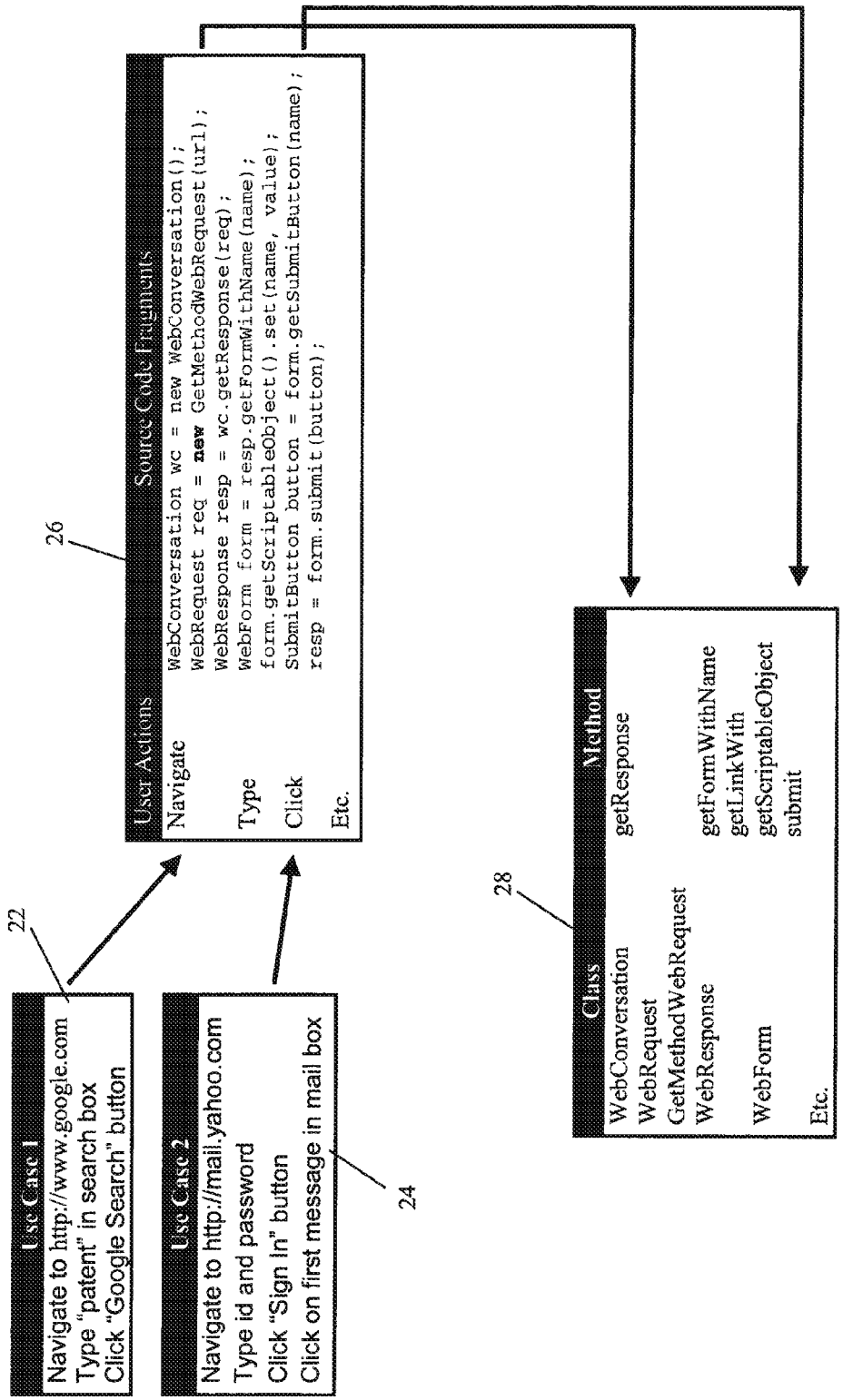
FIG. 2 is an exemplary diagram depicting how a test case is put together from a use case, according to one embodiment of the present invention.

In one embodiment, the present invention provides the ability for a user to define a series of user actions that are to be performed in a remote application being tested. The remote application may be a web application, web services, or other protocols. These user actions represent the real steps a user would take when interacting with the remote application. The actions are events like clicking a link that has some particular text, submitting a form, triggering a JavaScript event that submits a request, or submitting a manually constructed request. The actions can be configured in a test tool (for example, WebKing™). Each user action may cause a series of requests to be made to the web server hosting the remote application. Each request is an HTTP request, where the HTTP headers, the URL being requested, and the post data being sent along with the request may also be able to be modified by the user within the test tool.

An example of a testing framework is the HttpUnit library. HttpUnit is an open-source Java framework for programming a custom client that interacts with a web server and that validates the contents of the responses from the web server. The HttpUnit API allows the user to program the client at the level of actions taken by a user when interacting with a web application, such as clicking on a link or setting form fields and submitting the form. Example methods are "getLinkWith( )" to get a handle to a link with some specified text, and "click( )" to perform the action of clicking on the link. The API also allows the user to define custom requests to send to the server, and provides the ability to retrieve values at any location within the HTML response to be used in validating those values or in constructing a new response. HttpUnit is in fairly widespread use within the web development community.

JUnit is another open-source Java framework for creating and running Java-based unit tests. The framework provides an API for executing Java code, validating the runtime values of Java objects while the code is being executed, and reporting the results of the execution and validation. JUnit is in very widespread use within the Java development community. It is also commonly used in conjunction with HttpUnit, as JUnit provides the framework for writing and running Java-based unit tests, and HttpUnit provides the framework for creating tests that execute and validate a web application.

The invention provides a capability for converting a set of user actions performed for a remote application, such as a web application into a JUnit test that uses the HttpUnit API to define the same set of user actions. Validations on the contents of the responses that were set up within the tool GUI may also be transferred to the generated JUnit test. To do this, the invention iterates through each action one by one, checks how the request is determined (i.e. clicking a link, submitting a form, sending a custom request, etc.), and then generates corresponding Java code from the HttpUnit API that will mimic the same action.

Each Java source code fragment for all the actions is combined into a single JUnit test case that executes the same actions in the same order. In addition, the invention can convert validation tests, set up within a test tool to test the server responses, into Java code from the HttpUnit API that performs the same validations. When the JUnit test is run, the same series of requests will be made and the same validations done as would have been done if the test case were run within the user interface. However, the generated test cases are not dependent on the test tool, which typically has its own proprietary output and set up, since they only need the Java Runtime Environment and the relevant JUnit and HttpUnit libraries in order to run.

FIG. 1 is an exemplary process flow, according to one embodiment of the present invention. In block 11, a table including mapping between user inputs (for example, in a remote application such as a web application) and a corresponding source code fragment, for example supported by HttpUnit library, is stored.

FIG. 2 is an exemplary table depicting relationships between some use cases, mapping of user actions to source code fragments, and examples of classes and methods in HttpUnit API. Use cases 22 and 24 are simple examples of how a user might interact with two different common web applications—Google Maps™ and Yahoo Mail™, respectively. These use cases are example scenarios that a tester of those applications might want to define within a test tool in order to create regression tests to validate that the applications work properly in those scenarios. A mapping of user actions to source code fragments 26 determines the code fragments that correspond to each potential user action within a web application. The classes and methods shown in HttpUnit API list 28 are examples of a small subset of the classes defined by the HttpUnit API, along with one or two examples of methods that are defined in the API for each of those classes. These classes and methods are what is used to define the source code fragments in block 26, which in turn are what is used to define tests that verify the use cases in blocks 22 and 24, within the generated source code.

Referring back to FIG. 1, a user's actions in a remote application, such as a web application are recorded by a test tool, as shown in block 12. The table is then accessed to locate corresponding source code fragments for the recorded user actions, in block 13. The corresponding source code fragments are then retrieved and combined with other source code fragments needed to create a compile-able, functioning test case, to generate one or more source code-based test cases, in block 14. For example, for the use case in block 22, the source code fragments in block 26 are combined, substituting appropriate values, to represent the use case. Block 26 shows the three source code fragments that correspond to the three steps of Use Case 1. When the source code fragments are put together, they become the following:

WebConversation wc=new WebConveration( );
    WebRequest req=new GetMethodWebRequest("http://www.google.com");
    WebResponse resp=wc.getResponse (req);
    WebForm form=resp.getFormWithName("searchFormName");
    form.getScriptableObject( ).set("searchBox", "patent");
    SubmitButton button=form.getSubmitButton("Google Search");
    resp=form.submit(button);

"http://www.google.com" has been used as the URL in the first fragment, "searchFormName" as the form name in the second fragment, "searchBox" as the name of the search term input box in the second fragment, "patent" as the search query in the second fragment, and "Google Search" as the name of the form submit button in the third fragment. These fragments only represent the logic of the test case however; they are then combined with other source code fragments to create a complete, compile-able, functioning test case. The additional fragments provide the code that further defines the JUnit Java class that makes up the test case and allows it to be compiled and run. See below for an example of what an example test case looks like when the source code fragments representing the logic have been placed with the other code fragments to produce the complete source code for the test case.

In block 15, the source code-based test case is compiled. As shown in block 16, the compiled source code-based test case is then executed, using the Java Virtual Machine and library files (jar files) that contain the JUnit and HttpUnit implementations, to test the web application. This execution happens outside the context of the proprietary test tool that recorded and configured the user actions, since the proprietary test tool that generated the test case is not needed to run the test case.

In the above example, the source code-based test cases are constructed using the HttpUnit library, at the abstraction of user actions (instead of at the abstraction of network requests). The source code contains API calls to, for example, "click on a link", "enter data in a field", "click a button", etc. This allows the user to interact with the test cases at a level of abstraction that is similar to how one uses a web application. In essence, the "logic" of the use case through the web application is captured and transferred to the source code-based test cases, rather than just capturing and generating commands to make a simple sequence of URL requests to the web application.

An example of a source code-based test case is shown below.
import com.meterware.httpunit.*;
import junit.framework.*;

```
import webking.common.httpunit.*;
public class ParabankTest extends TestCase {
    private LoginInformation[ ] loginInfoCollection=new
LoginInformation[ ] (new LoginInformation ("Login",
"webking", "example")};
    public ParabankTest( ) {
        super (null);
    }
    protected void setUp( ) throws Exception {
        super.setUp( );
        ClientProperties.getDefaultProperties(   ).setAutoRe-
            fresh(true);
        ClientProperties.getDefaultProperties( ).setAutoRedi-
            rect(true);
        HttpUnitOptions.setEXceptionsThrownOnScriptError
            (false);
    }
    protected void tearDown( ) throws Exception {
        super.tearDown( );
    }
    public void testParabankTest( ) throws Exception {
        WebConversation wc=new WebConversation( )
        WebRequest  req=new  GetMethodWebRequest(get-
            BaseURL( ));
        WebResponse resp=wc.getResponse(req);
        //Begin Assertion Block
        resp=wc.getCurrentPage( );
        //End Assertion Block
        resp=wc.getCurrentPage( );
        WebForm form=resp.getFormWithName("Login");
        form.getScriptableObject( ).set("username", getUser-
            name("LogIn"));
        form.getScriptableObject( ).set("password", getPass-
            word("LogIn"));
        SubmitButton    button=form.getSubmitButton("sub-
            mit");
        resp=farm.submit(button);
        //Begin Assertion Block
        resp=wc.getCurrentPage( );
        //End Assertion Block
        resp=wc.getCurrentPage( );
        WebLink link=HttpUnitUtil.getLinkWith("Sign Off",
            resp);
        resp=link.click( );
        //Begin Assertion Block
        resp=wc.getCurrentPage( );
        //End Assertion Block
    }
    public String getBaseURL( ) {
        return "http://parabank.parasoft.com/";
    }
    public String getUsername(String formName) {
        String userName=" ";
        for (int i=0; i<loginInfoCollection.length; ++i) {
            LoginInformation info=loginInfoCollection[i];
            if (info.getFormName( ).equals(formName)) {
                userName=info.getUserName( );
            }
        }
        return userName;
    }
    public String getPassword(String formName) {
        String password=" ";
        for (int i=0; i<loginInfoCollection.length; ++i) {
            LoginInformation info=loginInfoCollection[i];
            if (info.getFormName( ).equals(formName)) {
                password=info.getPassword( );
            }
        }
        return password;
    }
    public static junit.framework.Test suite( ) {
        return new junit.framework.TestSuite(ParabankTest-
            .class);
    }
    public static void main(String[ ] args) {
        junit.textui.TestRunner.run(suite( ));
    }
}
```

In the example, the contents of the method testParabankTest are the combination of multiple source code fragments pertaining to the different user actions that make up the test case. All other code within the test case is supporting code needed to construct a functioning JUnit test case. The constructor ParabankTest and the methods setup, tearDown, suite, and main are needed to create a properly-constructed JUnit test. The methods getBaseURL, getUsername, and getPassword are convenience methods to aid in the extensibility and usability of the test case.

The series of actions defined in the test tool and/or converted to a source code-based test case can be defined by recording the actions taken by a user in a normal web browser; by sniffing the traffic between a web browser and the remote application server; by the user creating custom requests; or by a combination of these approaches. Recording the actions taken by a user in a web browser may involve using some kind of plug-in or extension to the browser that allows the test tool to track the actions of a user within the browser. Sniffing traffic may involve using some kind of http packet sniffer that records the network traffic between a browser and a web server; the test tool would then import the traffic data and create test cases that replicated the actions taken by the user in the browser, based on analyzing the http traffic. Creating custom requests simply means that the user either creates a use case in the test tool manually, using whatever means the test tool provides with which to do that, or the user modifies recorded test cases to customize them in some way.

In one embodiment, the method and system of the present invention includes the following process steps. A user sets up sequence of user actions in a test tool, for example, by recording in a browser, sniffing traffic, or other methods provided by the test tool. Optionally, the test tool may re-execute the sequence of actions and store the portions of each response to a request made to the remote application server that did not change. Optionally, the tool may automatically set up validation tests on fragments of the responses. Typically, these validation tests are only set up on portions of the response that were determined not to change in the previous step. The user is able to specify how many and what type of validation tests are set up at this step. The user, at his option, may manually set up validation tests on fragments of the responses.

The tool according to an embodiment of the present invention then iterates through its representation of each of the user actions, and generates an appropriate source code fragment for each action using the common API. Each fragment is designed to generate the same http requests as were configured by the user action definitions in the tool. The invention then iterates through the tool-generated and user-generated validation tests, and generates an appropriate source code fragment for each validation test using the common API. Each fragment is designed to perform the same validation as was configured in the tool.

A mapping between different kinds of validations and source code fragments that perform those validations has been stored by the test tool. This mapping is similar to the mapping between user actions and source code fragments, except that it deals with validations to perform instead of user actions to simulate. When the source code fragments are placed within the test case, the test tool may or may not comment them out within the test case. If the validation fragments are commented out, they will not be executed by the test case unless the user chooses to uncomment them. This allows the user to choose whether or not the validations should be performed after the test case has been generated, while still putting the validations into the code so that the user does not have to write them manually if she chooses to use them.

The invention then combines the source code fragments into one or more complete source code files, including any supporting code that is needed for the files to compile and for the code to run properly. This code may include custom helper methods that may or may not use the common API. If these helper methods do not use the common API, they are written entirely within the API of the language being used. When the source code is compiled and run, it performs the same requests and validates the responses in the same way that the test case was configured in the (proprietary) test tool. The source code can then be edited to add, modify, or delete portions of the test case depending on user needs. The test cases are then compiled and executed outside of the test tool, according to an embodiment of the present invention.

One difficulty in using the test cases that are defined in source code is that it is difficult to visually verify the results. The test cases may fail, but a user is unable to see what went wrong. In one embodiment, when generating the source code-based test case, the invention uses an extended version of the HttpUnit library. The extended version of the library includes additional API and functionality added to it.

In one embodiment, the added functionality (along with API to turn the functionality on and off) causes the test case being executed (after executing each user action or some subset of user actions) to show the current state of the remote application, in a browser. The invention captures the remote application responses that are received by the HttpUnit library, assembles and shows them in a browser. It allows the test case to run without a browser as part of an automated test, but then if the test fails, a user is able to turn on the browser feature (for example, by referencing a method in the API in the source code-based test case) and visually see in a browser where the failure occurred.

A test can fail if a user action is not able to be executed properly or if an assertion on the content of the remote application responses is not met. If the failure is due to an assertion failure, the remote application responses can optionally be altered, before showing them in a browser. When shown in the browser, the incorrect page element(s) are highlighted to make them more visible to the user. One example of how this may be done is by automatically changing the style attributes of those elements before showing the responses in the browser.

In one embodiment, instead of simply showing the responses in a browser after each (or specified) user actions, an image is captured of what the remote application looks like to a user within a browser. A series of images is captured after each (or specified) user action. The series of images is a set of snapshots of how the remote application would appear in a browser after each user action. The series of images is then stored in a database, along with a description of what use case the set of images is related to and a description of the particular user action that was taken immediately before each of the images was created. This allows images to be mapped to the user action sequences that produced them. This feature allows a user to visually verify the behavior of the remote application being tested. However, this extension allows a user to do the verification after the test case has been run, rather than having to do the verification while the test case is running. This makes verification accessible to a wider range of people, including business and other non-technical people who may be reviewing the results of the test.

The image can be generated in a number of ways. For example, the responses may be shown in a browser and then a "screen capture" function performed. Alternatively, a library with capability of generating an image of what a remote application looks like in a particular browser based on the responses received from the remote application could be used.

In one embodiment, instead of storing images, the actual responses from the remote application in the form of HTML, CSS, JavaScript, and other files are stored in a database. The files are grouped by user action, and these groups are stored in a database, along with a description of what use case each group of files is related to and a description of the particular user action that was taken immediately before each of the file groups was recorded.

In one embodiment, the invention modifies the test tool so that it keeps the proprietary test cases and source code-based test cases in synchronization. For example, when a change is made to the proprietary test case, the test tool recognizes the change and updates the source code-based test case with the appropriate source code fragment(s) that reflects the change made to the proprietary test case. Similarly, when a change is made to the source code-based test case, the test tool recognizes that, identifies the change made in the source code, and makes an appropriate change in the proprietary test case that reflects the change made in the source code.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications as defined by the appended claims.

What is claimed is:

1. A method executed by one or more computers for generating source code-based test cases for a remote application requiring a plurality of users' actions, the method comprising:

storing a table including the users' action required by the remote application and corresponding source code fragments, respectively, the user's actions representing actual steps a user would take when interacting with the remote application;

recording a user's actions in the remote application by a test tool, when the user is interacting with the remote application;

accessing the table to locate corresponding source code fragments for the recorded user's actions;

retrieving the corresponding source code fragments to generate source code-based test cases, which emulate said recorded user's actions in the remote application;

compiling the source code-based test cases; and executing the compiled source code-based test cases outside of the test tool to test the remote application.

2. The method of claim 1, further comprising displaying a current status of the remote application as the source code-based test case is executed.

3. The method of claim 2, further comprising highlighting incorrect page elements to make them more visible to the user.

4. The method of claim 1, further comprising displaying a current status of the remote application including a visual display of a failure's location, in a browser, as the source code-based test case is executed.

5. The method of claim 1, further comprising displaying an image of the remote application in a browser.

6. The method of claim 5, wherein displaying an image of the remote application comprises capturing a series of images after each specified user action; storing the captured series of images in a database along with a description of what use case the set of images is related to, and a description of a particular user action taken before the image was captured.

7. The method of claim 1, wherein the remote application is a web application.

8. A system for generating source code-based test cases for a remote application requiring a plurality of users' actions, comprising:

a memory for storing a table including the users' action required by the remote application and corresponding source code fragments, respectively, the user's actions representing actual steps a user would take when interacting with the remote application;

a first computer for executing a test tool for recording user's actions in the remote application, when the user is interacting with the remote application;

a second computer for accessing the table to locate corresponding source code fragments for the recorded user's actions, for retrieving the corresponding source code fragments to generate source code-based test cases, which emulate said recorded user's actions in the remote application, and for compiling the source code-based test cases; and a third computer for executing the compiled source code-based test cases outside of the test tool.

9. The system of claim 8, further comprising a display for displaying a current status of the remote application.

10. The system of claim 9, wherein the display is configured to highlight incorrect page elements to make them more visible to the user.

11. The system of claim 8, further comprising a browser executed by the third computer for displaying on the display a current status of the remote application including a visual display of a failure's location.

12. The system of claim 8, wherein the display is configured to display an image of the remote application in a browser.

13. The system of claim 8, wherein the remote application is a web application.

* * * * *